UNITED STATES PATENT OFFICE.

DAVID SPENCE, OF NORWALK, CONNECTICUT.

PROCESS OF DEVULCANIZATION.

1,235,850.     Specification of Letters Patent.     Patented Aug. 7, 1917.

No Drawing.     Application filed June 27, 1914. Serial No. 847,706.

*To all whom it may concern:*

Be it known that I, DAVID SPENCE, a subject of the King of Great Britain and Ireland, residing at Norwalk, in the county of Fairfield and State of Connecticut, have invented certain new and useful Improvements in Processes of Devulcanization, of which the following is a specification.

This invention relates to a process of devulcanization and provides for the removal of combined sulfur from vulcanized rubber waste, and its novelty consists in the several steps of the process employed and the application of the principles upon which it is based.

In the process of vulcanization of india rubber by sulfur I have shown that the rubber actually takes up and combines with the sulfur, and that when an excess of sulfur is present, a definite and fully saturated derivative having the formula $C_{10}H_{16}S_2$ is formed. *Koll. Zeitschr.*, XI, 28 (1912), XIII, 271 (1913).

This derivative constitutes what is known as hard rubber.

In the preparation of so-called soft-rubber goods, about 1.8–3% of sulfur combined with rubber, is actually required and in consequence when more than this amount of sulfur is incorporated with the rubber, there should always remain uncombined, a certain quantity of so-called free sulfur depending upon the amount of total sulfur present. The removal of this free sulfur from vulcanized rubber can readily be effected by well known means, and, in conjunction with a certain plasticizing or depolymerizing action, on the rubber, analogous to the plasticizing action of mechanical working and heat on raw rubber, the removal of free sulfur is all that is effected by present day processes of rubber regeneration.

I am aware that processes claiming to describe the devulcanization of vulcanized rubber have been patented, some of which assert the removal of the combined sulfur of vulcanization as well as the free sulfur, but investigation of these by myself and others, (Alexander, *Chem. Ztg.* 1910, 789; 1912), has shown that except for their plasticizing or softening action on the rubber and the removal of the free sulfur, they leave the rubber practically unchanged; either none of the combined sulfur at all is removed or the amount is so small that it is quite impossible to speak of it as real devulcanization. And as far as hard rubber is concerned, there is no evidence in the literature of the art to show that the removal of the combined sulfur from this has ever been accomplished.

The process herein described has for its object, the removal of not merely traces of the combined sulfur, but of large proportions of the combined sulfur of vulcanization, and is applicable not merely to rubber waste containing 2 to 3% of combined sulfur, but to the product of complete saturation of the rubber hydrocarbon, known as hard rubber (which contains as its principal constituent, a body considered to have the formula $C_{10}H_{16}S_2$), which may contain as much as 32% of combined sulfur.

The process is in line with the fact that the vulcanization of rubber by sulfur is a reaction whose velocity can be accelerated (*Koll. Zeitsch.*, XI, 275; XIII, 271), and to be technically successful, therefore, requires an accelerator to facilitate the reaction. The more powerful the accelerator employed, the more violent and the more complete will be the reaction. Without such an accelerator the vulcanization of rubber proceeds very slowly, even at high temperatures, whereas in the presence of even a trace (1/100 of 1%) of a suitable accelerator vulcanization of rubber by sulfur can be effected in a few minutes.

By reason of the character of the vulcanization process it appeared to me therefore, that the true solution of the problem of effecting a real devulcanization of vulcanized rubber must lie in the use of a powerful vulcanizing accelerator in conjunction with an element capable of combining with and fixing the sulfur liberated from the rubber by the accelerator. The more powerful the accelerator, the more marked should be the results obtained by the means of it. And this principle should govern the choice of the accelerator employed. Theoretically, all that is necessary is a powerful accelerator and an element or substance to combine with the sulfur set free by the accelerator. The presence of this latter substance will even be unnecessary if the accelerator itself is employed in excess and is capable of forming a stable derivative with the sulfur under the temperature and other conditions of the experiment.

I have tested the principle by experiments and have shown that it actually forms the basis of a successful desulfurization of vulcanized rubber, and have succeeded in effecting the removal of large proportions of the combined sulfur from vulcanized india rubber by the use of several of the most powerful of those reagents which are known to the art as "catalysts," or more usually "accelerators" employed in vulcanization, and which in order to avoid confusion I shall group under the general term of "vulcanizing accelerator."

It will be evident that the results obtained in carrying out this invention will depend very largely on the accelerator employed, some accelerators being very much more efficient than others. Thus I have found that anilin which has long been known as a solvent for vulcanized rubber waste produces practically no reduction in the combined sulfur when caused to act upon vulcanized rubber; similarly the oxids of the heavy metals, such as lead, etc., which have long been used to accelerate vulcanization, produce only a slight reduction in the combined sulfur when vulcanized rubber is heated with them; none of these substances however, can be regarded as powerful accelerators in vulcanization and cannot be properly termed catalysts in devulcanization. On the other hand, and as an example of a powerful accelerator we have found that a solution of anilin-potassium or of anilin-sodium in excess of anilin which is formed by the action of dry anilin on metallic potassium, or sodium can be used very effectively in removing combined sulfur from vulcanized rubber; this solution in addition to its accelerant action actually serves as a means of fixing the sulfur liberated from the rubber as an insoluble metallic sulfid.

As an example of a powerful organic accelerator which is very effective in removing combined sulfur, piperidin may be mentioned. Caustic soda, which we have long since shown to be one of the most powerful of inorganic catalysts, is another suitable substance for effecting removal of combined sulfur of vulcanized india rubber. This substance has the advantage of being cheap.

It is impossible to set forth all the reagents which fall within the class of substances acting as accelerators in vulcanization. By the methods of organic chemistry I have prepared a large number of such substances all showing the property in common of accelerating the velocity of reaction between rubber and sulfur. Similarly it is impossible to describe one simple method of application which will be applicable to all accelerators alike. Generally speaking, however, I have found it is best to work with all components of the reaction in solution; and in this connection the use of a solution of anilin-potassium in excess of anilin sufficient to dissolve the rubber at the operating temperature is particularly advantageous. In this case, the rubber, as well as the accelerator, is brought into intimate contact in anilin solution, and the sulfur which is liberated is thrown out of the field of reaction as an insoluble alkaline sulfid.

In the case where caustic soda is employed as the devulcanizing agent, the less complete devulcanization effected is explained by the fact that no solvent or means have yet been found of bringing this accelerator and the rubber together in homogeneous solution.

I have found vigorous agitation facilitates the reaction. Similarly, the process in order to effect the best results, should be carried out in absence of moisture, the presence of water having been found to be particularly disadvantageous. The temperature at which the reaction may be carried out may vary within wide limits according to the reagent used, etc., etc., so that it is impossible to describe any one set of conditions which will be applicable in all cases.

For example, in one experiment actually carried out using a powerful organic accelerator, piperidin, over 25% of the combined sulfur of the original rubber was removed in a short time at a temperature only slightly above normal air temperature. Generally speaking, however, the higher the temperature, within certain limits, the better will be the results obtained, and for practical purposes I have found that a temperature of about 170 to 180° C., is usually advantageous.

As examples of how the process may be carried out we cite the following:

1. Five parts of metallic sodium are dissolved by means of heat in 100 parts of anilin and 5 parts of soft cured, vulcanized rubber previously extracted till free from uncombined sulfur are added. The mass is then heated in a closed vessel with vigorous agitation for 3½ hours and at a temperature of about 175 degrees centigrade. The mass is filtered and then allowed to cool and the anilin which separates is drawn off or the anilin may be removed by distillation with steam. The soft sticky residue which is left after separation of the anilin may be freed from mineral matter, and other insoluble impurities if desired, by dissolving it in benzol and centrifuging the benzol solution, and the rubber is removed from the clear solution by precipitation, or by other suitable means. The rubber is finally boiled out with water containing a small quantity of hydrochloric acid to neutralize the excess of alkali present, and to decompose the alkaline sulfids formed, and by repeated boiling out with water followed by washing with cold water on the cold rolls of a washing mill, a tough, elastic and no longer sticky sheet of rubberlike substance is obtained. By this method and using a sample of vulcanized rubber containing 4.1% of combined sulfur, the sulfur was reduced to 0.9%. 78% of the combined sulfur of the rubber was removed in one operation.

2. Another sample of normal, soft cured, vulcanized rubber containing no free sulfur or mineral or other fillers is heated in a closed vessel in solution in anilin with metallic potassium, in amount equal to the weight of the rubber (previously dissolved in the anilin) for 5½ hours at 175 to 180 degrees centigrade. The solution is then filtered while still warm, through fine muslin and to the filtrate HCl is added to drive off $H_2S$. The anilin is distilled off in steam and the residue left is dissolved in benzol, and the solution centrifuged. The clear benzol solution is then evaporated and the soft sticky residue which is left is worked up as in the previous example, into an elastic mass. The combined sulfur in a sample of vulcanized rubber, as above, was reduced in one operation from 2.7% to 0.29%; about 90% of the sulfur was, therefore, removed.

3. Five parts of soft cured vulcanized rubber, free from mineral fillers and uncombined sulfur is heated in an autoclave for four hours at 180 degrees with 200 parts of para-amido-dimethyl anilin containing 25 parts of the hydrochlorid of this base. The rubber is then isloated by pouring the mass into water acidulated with dilute HCl, boiling out and washing repeatedly the rubber which separates. A sample of vulcanized rubber containing 4.1% of combined sulfur lost about 50% of this amount in one treatment as above.

4. Ten parts of vulcanized rubber waste from which the free sulfur has been extracted, is heated with 25 parts of powdered anhydrous caustic soda and 200 parts of xylol for 3 hours at 140 degrees centigrade in an autoclave provided with agitation. The rubber waste is first dissolved, or partially dissolved in the xylol and the powdered alkali is then added while vigorous agitation is maintained throughout the mass. The solution is centrifuged till free from insoluble sulfids and other insoluble matter, is then treated with a small quantity of HCl to decompose the last traces of alkali and alkaline sulfids present, and the rubber is precipitated from the solution by acetone, or is isolated by any other well known means. By repeated boiling out with water followed by thorough washing with cold water on the mill a tough elastic sheet of a rubber-like substance is obtained. In the case of a sample of vulcanized rubber containing 4.1% of combined sulfur treated in this way, the combined sulfur was reduced to 1.2%; 70% of the combined sulfur was removed in one operation.

5. Five parts of extracted hard rubber dust containing originally 32% of combined sulfur is heated for five hours at 175 degrees centigrade in an autoclave with 300 parts of anilin containing 5 parts of metallic potassium. The mass is cooled and the solution is filtered through fine muslin. To the filtrate HCl is added to drive off $H_2S$ and the anilin is distilled off with steam. The residue remaining is dissolved in benzol and the benzol solution is centrifuged. The resulting clear liquor is then separated and the solvent is evaporated. The residue which is left is boiled out repeatedly with water. It is a brownish black solid at the ordinary temperature which softens up readily on warming to a soft sticky mass not unlike overcured soft rubber. It is soluble in benzol and chloroform, and sparingly soluble in alcohol. In the example given 73% of the combined sulfur of the hard rubber is removed in one operation, 8.9% of combined sulfur remaining.

It will be at once understood that variations can be made in the mode of carrying out this process. Thus I do not limit myself to working in solution or to any particular solvent; the process may be applied by any means whereby the material to be treated and the devulcanizing agent or agents are brought into intimate mixture or contact. Nor do I confine myself to any particular devulcanizing agent or agents falling in the class of substances which act as accelerators in vulcanization, recognizing that the more powerful the reagent, the more complete will be the desulfurization effected. It will also be noted that in most of the above examples, it is indicated that the free sulfur is removed prior to the treatment for the purpose of removing the combined sulfur, and this is considered at the present time the preferred method, though it may not be necessarily the essential one.

What I claim is:—

1. A process of removing combined sulfur from vulcanized rubber which comprises reducing the rubber to a finely divided state, and subjecting the same to the action of an organic vulcanizing accelerator, in the presence of a reagent capable of removing the combined sulfur liberated from the rubber, by uniting with the same.

2. A process of removing combined sulfur from vulcanized rubber which comprises subjecting the finely divided rubber to the action of an excess of an organic vulcanizing accelerator, in the presence of a reagent capable of removing the combined sulfur liberated from the rubber by uniting therewith, which reagent may be a portion of the accelerator itself.

3. The process of removing combined sulfur from vulcanized rubber, which consists in dissolving the rubber in a suitable solvent and subjecting it at a suitable temperature to the action of a vulcanizing accelerator in the presence of a reagent adapted to combine with the sulfur when freed from the rubber.

4. The process of removing the combined sulfur from vulcanized rubber, which consists in dissolving the rubber in a suitable solvent, and subjecting it at a suitable temperature to the action of a substantial excess of an organic vulcanizing accelerator in the presence of a reagent adapted to combine with the sulfur when freed from the rubber, which reagent may be a portion of the accelerator in devulcanization itself.

5. The process of removing the combined sulfur from vulcanized rubber, which consists in dissolving the latter in a suitable solvent, dissolving in the same solvent a substantial excess of a vulcanizing accelerator. together with a reagent adapted to combine with the sulfur when freed from the rubber, which reagent may be a part of the accelerator itself.

6. The process of removing the combined sulfur from vulcanized rubber, which consists in dissolving the latter in an organic solvent, and subjecting it at a suitable temperature, to the action of a substantial excess of an alkaline derivative of an alkali metal.

7. The process of removing the combined sulfur from vulcanized rubber which consists in dissolving the latter in an aromatic amin, and subjecting it at a suitable temperature to the action of a substantial excess of an alkaline derivative of an alkali metal.

8. The process of removing the combined sulfur from vulcanized rubber, which consists in dissolving the latter in an aromatic amin and subjecting it at a suitable temperature to the action of a substantial excess of sodium anilate.

9. The process of removing the combined sulfur from vulcanized rubber which consists in dissolving the latter together with metallic sodium in anilin, under the influence of heat, and thereafter removing the anilin and the alkaline sulfid formed.

10. The process of removing the combined sulfur from vulcanized rubber, which consists in dissolving the latter in anilin, together with metallic sodium, heating for several hours at a temperature of about 170 degrees centigrade, and then removing the anilin and purifying the resulting product.

11. The process of removing combined sulfur from vulcanized rubber, which consists in subjecting the same to a powerful vulcanizing accelerator under anhydrous conditions.

12. The process of removing combined sulfur from vulcanized rubber, which consists in subjecting the same to a vulcanizing accelerator, under anhydrous conditions, said accelerator having an organic element and further containing an ingredient capable of removing the combined sulfur liberated from the rubber, by combining therewith.

13. A process of devulcanizing rubber which comprises dissolving the same in a suitable solvent and subjecting the same to the action of a devulcanizing material, an alkali metal dissolved in a suitable aromatic amin.

14. A process of devulcanizing rubber which comprises dissolving the rubber from which the free sulfur has previously been removed, in a solvent and subjecting the same to the action of an excess of a devulcanizing material containing an alkali metal dissolved in a suitable aromatic amin.

15. A process of devulcanizing rubber which comprises dissolving the vulcanized rubber from which the free sulfur has previously been removed, in an organic solvent and subjecting the same to the action of an alkaline derivative of an alkali metal.

16. A process of devulcanizing rubber which comprises subjecting the rubber from which the free sulfur has previously been removed to the action of a devulcanizing reagent comprising a vulcanizing accelerator and a reagent capable of eliminating at least a portion of the combined sulfur of the rubber by combining therewith.

17. A process of devulcanizing rubber which comprises subjecting the rubber from which the free sulfur has been previously removed, to the action of a dry agent capable of abstracting at least a portion of the combined sulfur of the rubber, by combining therewith in the presence of a vulcanizing accelerator.

18. A process of treating vulcanized rubber to remove combined sulfur therefrom which consists first in removing all of the uncombined sulfur, and then treating the residue with a suitable vulcanizing catalyst in the presence of a reagent capable of uniting with the sulfur as it is released from its combination with the rubber at a suitable temperature.

19. The process for the devulcanization of vulcanized rubber which consists in bringing together in as intimate mixture as possible the rubber from which the free sulfur has previously been removed, an accelerating agent that will act to free a substantial portion of the combined sulfur and a sulfur combining agent, and subjecting them to a proper temperature for a proper length of time until the desired reaction is completed.

20. The process for the devulcanization of vulcanized rubber, which consists in bringing together in one solution the rubber, from which the free sulfur has previously been removed, an accelerating agent that will act to free a substantial portion of the combined surfur and a sulfur combining agent, and subjecting them to a proper temperature for a proper length of time until the desired reaction is completed.

21. The process of treating vulcanized rubber, which consists in removing the uncombined sulfur therefrom and afterward subjecting the residue to the action of an organic vulcanizing accelerator in the presence of a reagent capable of removing the combined sulfur liberated from the rubber by uniting with such combined sulfur.

In testimony whereof I affix my signature in presence of two witnesses.

DAVID SPENCE.

Witnesses:
  G. D. KRATZ,
  W. F. RUSSELL.